(12) United States Patent
Honjo et al.

(10) Patent No.: US 9,946,645 B2
(45) Date of Patent: Apr. 17, 2018

(54) INFORMATION PROCESSING APPARATUS AND MEMORY CONTROL METHOD

(71) Applicant: CANON KABUSHIKI KAISHA, Tokyo (JP)

(72) Inventors: Tomoya Honjo, Tokyo (JP); Takahisa Yamamoto, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 159 days.

(21) Appl. No.: 14/224,145

(22) Filed: Mar. 25, 2014

(65) Prior Publication Data

US 2014/0297989 A1    Oct. 2, 2014

(30) Foreign Application Priority Data

Mar. 27, 2013  (JP) ................................ 2013-067126

(51) Int. Cl.
 *G06F 12/06* (2006.01)
(52) U.S. Cl.
 CPC ...... *G06F 12/0607* (2013.01); *G06F 12/0623* (2013.01)
(58) Field of Classification Search
 CPC ... G06F 12/0607; G06F 8/34; G06F 2212/302
 See application file for complete search history.

(56) References Cited

U.S. PATENT DOCUMENTS

| | | | | |
|---|---|---|---|---|
| 5,455,599 A * | 10/1995 | Cabral | ................... | G06T 17/00 345/418 |
| 2003/0231176 A1 * | 12/2003 | Oka | ....................... | G09G 5/393 345/419 |
| 2008/0263290 A1 * | 10/2008 | Yamada | .................. | G06F 12/06 711/154 |
| 2010/0180150 A1 * | 7/2010 | Jeddeloh | ............... | G06F 11/073 714/5.1 |
| 2012/0163763 A1 * | 6/2012 | Fujimoto | ............. | G11B 27/322 386/225 |
| 2012/0294583 A1 * | 11/2012 | Kosaka | ................. | G06T 3/4038 386/230 |
| 2014/0181827 A1 * | 6/2014 | Dice | ........................ | G06F 9/52 718/103 |

FOREIGN PATENT DOCUMENTS

| | | |
|---|---|---|
| JP | 2003-323339 A | 11/2003 |
| JP | 2010-205002 A | 9/2010 |
| JP | 2010205002 A * | 9/2010 |

OTHER PUBLICATIONS

J. Gall, et al., "Class-Specific Hough Forests for Object Detection" in IEEE Conference on Computer Vision and Pattern Recognition, 2009, pp. 1-8.

Japanese office action issued in corresponding application No. 2013067126 dated Feb. 13, 2017.

* cited by examiner

*Primary Examiner* — Ann J Lo
*Assistant Examiner* — Masud Khan
(74) *Attorney, Agent, or Firm* — Carter, Deluca, Farrell & Schmidt, LLP

(57) ABSTRACT

An information processing apparatus comprises a plurality of processor elements, and a memory having a plurality of banks. Statistical information representing an access frequency distribution to each memory area of the memory by the plurality of processor elements is obtained. An allocation process of allocating the banks to the memory areas is performed based on the statistical information.

8 Claims, 13 Drawing Sheets

FIG. 4

| BIN NUMBER | FREQUENCY RANK | BEFORE BANK ALLOCATION PROCESS | AFTER BANK ALLOCATION PROCESS |
|---|---|---|---|
| ...... | ...... | ...... | ...... |
| X-Y-18 | 10 | C | B |
| X-Y-19 | 4 | D | D |
| X-Y-20 | 1 | A | A |
| X-Y-21 | 6 | B | B |
| X-Y-22 | 11 | C | C |
| ...... | ...... | ...... | ...... |
| X-Y-39 | 5 | D | A |
| X-Y-40 | 2 | A | B |
| X-Y-41 | 7 | B | C |
| ...... | ...... | ...... | ...... |
| X-Y-59 | 8 | D | D |
| X-Y-60 | 3 | A | C |
| X-Y-61 | 9 | B | A |
| ...... | ...... | ...... | ...... |

FIG. 6A
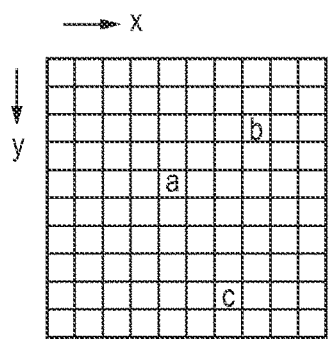
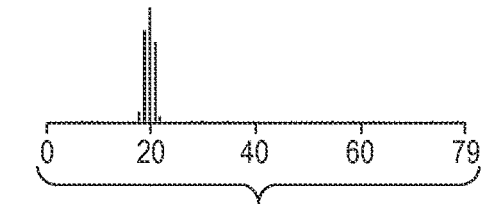
ORIENTATION VOTING BINS AT a (x0, y0)
(80)
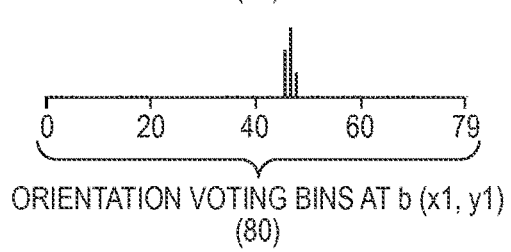
ORIENTATION VOTING BINS AT b (x1, y1)
(80)
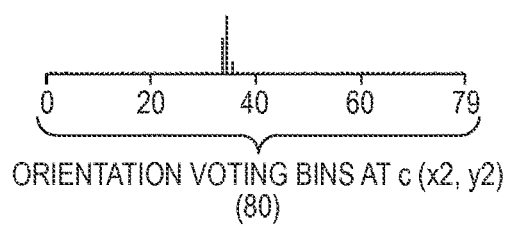
ORIENTATION VOTING BINS AT c (x2, y2)
(80)
FIG. 6B
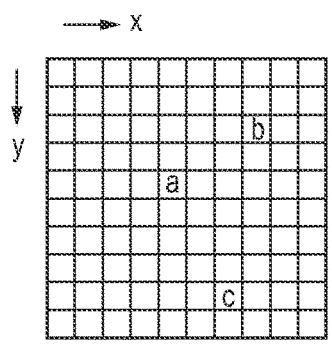
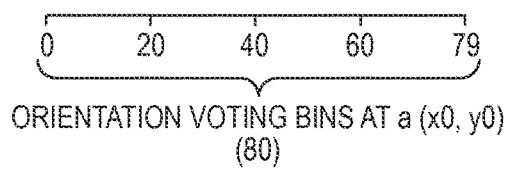
ORIENTATION VOTING BINS AT a (x0, y0)
(80)
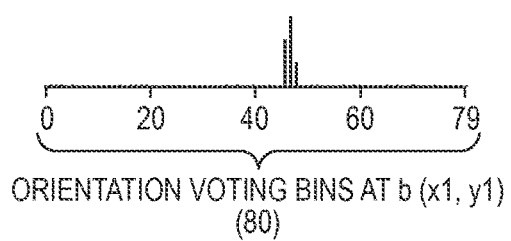
ORIENTATION VOTING BINS AT b (x1, y1)
(80)
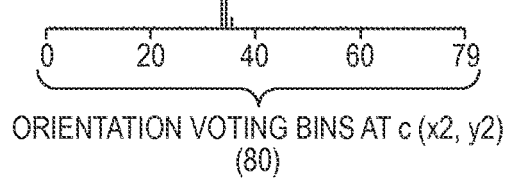
ORIENTATION VOTING BINS AT c (x2, y2)
(80)

FIG. 7

| BIN NUMBER | FREQUENCY RANK | FREQUENCY VALUE | MASK | BEFORE BANK ALLOCATION PROCESS | AFTER BANK ALLOCATION PROCESS |
|---|---|---|---|---|---|
| ...... | ...... | ...... | ...... | ...... | ...... |
| X0-Y0-19 | 2 | 8 | 0 | D | D |
| X0-Y0-20 | 1 | 10 | 0 | A | A |
| X0-Y0-21 | 3 | 7 | 0 | B | B |
| ...... | ...... | ...... | ...... | ...... | ...... |
| X1-Y1-46 | 6 | 4 | 1 | A | C |
| X1-Y1-47 | 4 | 6 | 1 | C | A |
| X1-Y1-48 | 8 | 2 | 1 | D | D |
| ...... | ...... | ...... | ...... | ...... | ...... |
| X2-Y2-34 | 7 | 3 | 1 | A | D |
| X2-Y2-35 | 5 | 5 | 1 | C | B |
| X2-Y2-36 | 9 | 1 | 1 | D | C |
| ...... | ...... | ...... | ...... | ...... | ...... |

FIG. 12

| BIN NUMBER | FREQUENCY RANK | BEFORE BANK ALLOCATION PROCESS | AFTER BANK ALLOCATION PROCESS |
|---|---|---|---|
| ...... | ...... | ...... | ...... |
| X10-Y10-19 | 2 | D | B |
| X10-Y10-20 | 1 | A | A |
| X10-Y10-21 | 3 | B | C |
| ...... | ...... | ...... | ...... |
| X11-Y11-19 | 8 | D | D |
| X11-Y11-20 | 4 | A | D |
| X11-Y11-21 | 9 | B | A |
| ...... | ...... | ...... | ...... |
| X12-Y12-19 | 10 | D | B |
| X12-Y12-20 | 5 | A | A |
| X12-Y12-21 | 11 | B | C |
| ...... | ...... | ...... | ...... |
| X13-Y13-19 | 12 | D | D |
| X13-Y13-20 | 6 | A | B |
| X13-Y13-21 | 13 | B | A |
| ...... | ...... | ...... | ...... |
| X14-Y14-19 | 14 | D | B |
| X14-Y14-20 | 7 | A | C |
| X14-Y14-21 | 15 | B | C |
| ...... | ...... | ...... | ...... |

INFORMATION PROCESSING APPARATUS AND MEMORY CONTROL METHOD

BACKGROUND OF THE INVENTION

Field of the Invention

The present invention relates to an information processing apparatus comprising a plurality of processor elements and a memory having a plurality of banks, and memory control thereof.

Description of the Related Art

In an information processing apparatus using a plurality of processor elements and a memory having a plurality of banks, when the plurality of processor elements access the memory, only one portion of each bank is accessible at once. Hence, when accesses occur simultaneously from a plurality of processor elements to a plurality of portions belonging to the same bank, the accesses cannot be processed simultaneously, and the process speed lowers. This situation is called "bank conflict."

In general, bank conflict readily occurs in a parallel processing apparatus or system which has a relatively high throughput and performs access to a shared memory using a plurality of processor elements in parallel. An example of such a system is a robot system that executes a task such as picking a part from a part group on, for example, a production line of a factory. The robot system executes a process of recognizing the positions and orientations of parts stacked on a part box by an image process. If a number of image processes are parallelly performed for the recognition process, bank conflict may occur, resulting in a decrease in the process speed.

Various techniques have been proposed as memory control methods for suppressing bank conflict. For example, there has been proposed a technique of specifying the shape of a rendering target graphic, selecting an interleave pattern type adapted to the specified graphic shape, and controlling access to a memory in accordance with the pattern.

According to this technique, an interleave pattern to be used is selected at the time of access. In some cases, however, data cannot apply to any pattern. This occurs when, for example, access target data extends over a plurality of portions of a memory, and an optimum interleave pattern changes between the data. In this case, the above technique produces only a poor effect of reducing bank conflict.

SUMMARY OF THE INVENTION

In one aspect, an information processing apparatus comprising: a plurality of processor elements; a memory having a plurality of banks; an obtaining unit configured to obtain statistical information representing an access frequency distribution to each memory area of the memory by the plurality of processor elements; and an allocation unit configured to perform an allocation process of allocating the banks to the memory areas based on the statistical information.

According to the aspect, it is possible to reduce bank conflict by performing a bank allocation process based on statistical information of memory access.

Further features of the present invention will become apparent from the following description of exemplary embodiments with reference to the attached drawings.

BRIEF DESCRIPTION OF THE DRAWINGS

FIG. 4 is a view showing an example of bank allocation.

FIGS. 6A and 6B are views showing a result of a recognition process for object position and orientation and a result of a frequency distribution estimation process.

FIG. 7 is a view showing an example of bank allocation.

FIG. 12 is a view showing an example of bank allocation.

DESCRIPTION OF THE EMBODIMENTS

Figure 1:
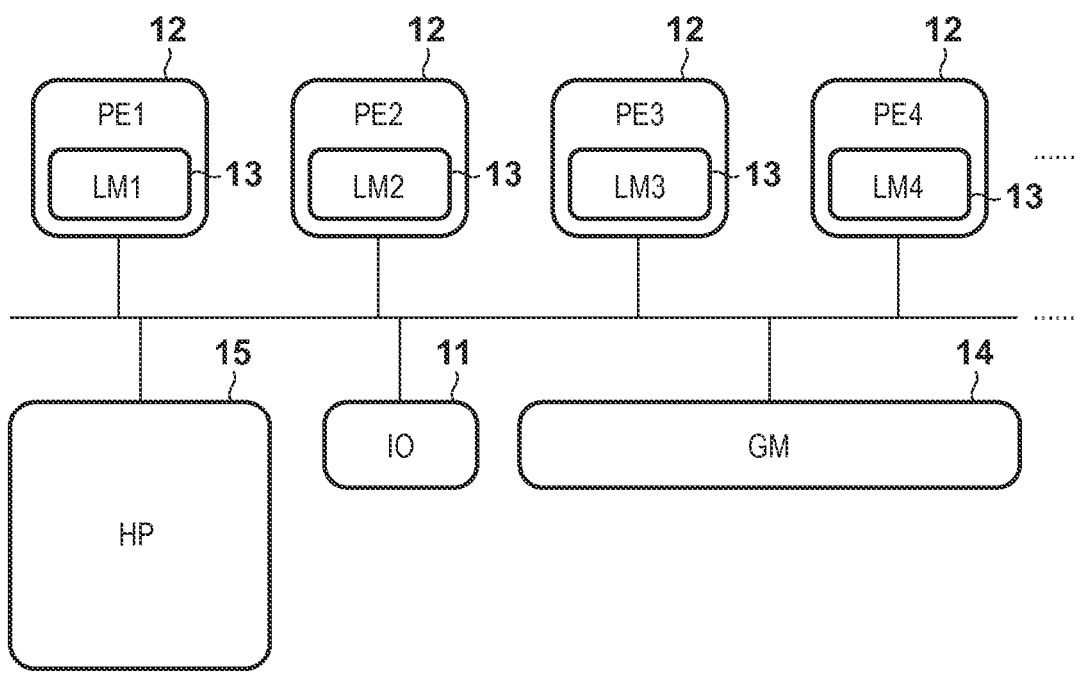
FIG. 1 is a block diagram showing the arrangement of an information processing apparatus according to an embodiment.

Preferred embodiments of the present invention will now be described in detail with reference to the accompanying drawings. It should be noted that the components set forth in the following embodiments are merely examples, and the present invention is not limited to the illustrated arrangements.

[Statistical Information]

In the embodiments of the present invention, bank allocation is set based on statistical information of data access, thereby enhancing a bank conflict reduction effect. Prior to a description of the embodiments, statistical information mentioned in this embodiment will briefly be explained.

Statistical information according to this embodiment is information that statistically represents in what manner data of interest in a memory area is accessed. A simplest example of statistical information is a memory access frequency distribution in a certain period. From the second embodiment, an example in which statistical information considering a process to be performed subsequently is generated based on a memory access frequency distribution will be described.

First Embodiment

Memory access control in an information processing apparatus that performs a process of recognizing the position and orientation of an object by an image process (to be referred to as "recognition process for object position and orientation" hereinafter) will be described below. The recognition process for object position and orientation is executed by, for example, a robot system which executes a task such as picking a part on, for example, a production line of a factory to recognize the positions and orientations of stacked parts by an image process.

The recognition process for object position and orientation and prerequisites therefor will be described first.

[Recognition Process for Object Position and Orientation]

Image process target data such as an image obtained by capturing parts will be defined as "image data," image data extracted from image data will be defined as "partial image data," and data such as parameters necessary for an image process other than image data will be defined as "dictionary data."

The recognition process for object position and orientation according to this embodiment is assumed to use a method based on a process algorithm described in a literature below. The recognition process for object position and orientation has already been described in detail in the literature below and other various literatures, and only portions characteristic to this embodiment will be explained below.

J. Gall and V. Lempitsky, "Class-Specific Hough Forests for Object Detection" In IEEE Conference on Computer Vision and Pattern Recognition, 2009

The recognition process for object position and orientation according to this embodiment mainly includes the following two processes. One is a partial image recognition process of comparing information obtained from partial image data with a plurality of dictionary data and voting the result in a voting space for position and orientation. The other is a statistical information computing process of recognizing the position and orientation of an object from the result of the partial image recognition process for all partial images.

In the partial image recognition process, the luminance difference between a plurality of two-point sets in partial image data designated by dictionary data is calculated. A result of the recognition process for object position and orientation derived from there is voted in the voting space for position and orientation. The voting result of the voting space for position and orientation after the partial image recognition process has been performed for all partial images will be defined as a "histogram of object position and orientation." In this embodiment, a histogram of object position and orientation representing an access frequency distribution to a shared memory indicates statistical information of access to target data in the shared memory.

In the statistical information computing process, a combination of positions and orientations corresponding to a bin having the maximum polled vote count in the histogram of object position and orientation is defined as the first candidate of the position and orientation of the target object, and information representing the position and orientation is output as the result of the recognition process for object position and orientation. Then, the second candidate, the third candidate, . . . , are output in descending order of polled vote count.

[Prerequisites]

Assume that the number of position voting bins is 100 and the number of orientation voting bins is 80 in this embodiment. That is, examine a case in which there exist 100× 80=8000 different combinations of positions and orientations.

In this embodiment, when parts are stacked, all part positions are assumed to appear at the same probability.

Additionally, when parts are stacked, part orientations are assumed to appear with a deviation to some extent. As a result, bins to which voting can be done also appear with a deviation. However, the probability each orientation can occur does not depend on part positions. That is, examine a case in which a histogram of voting ease of the respective bins is obtained as shown in FIG. 3.

Figure 3:
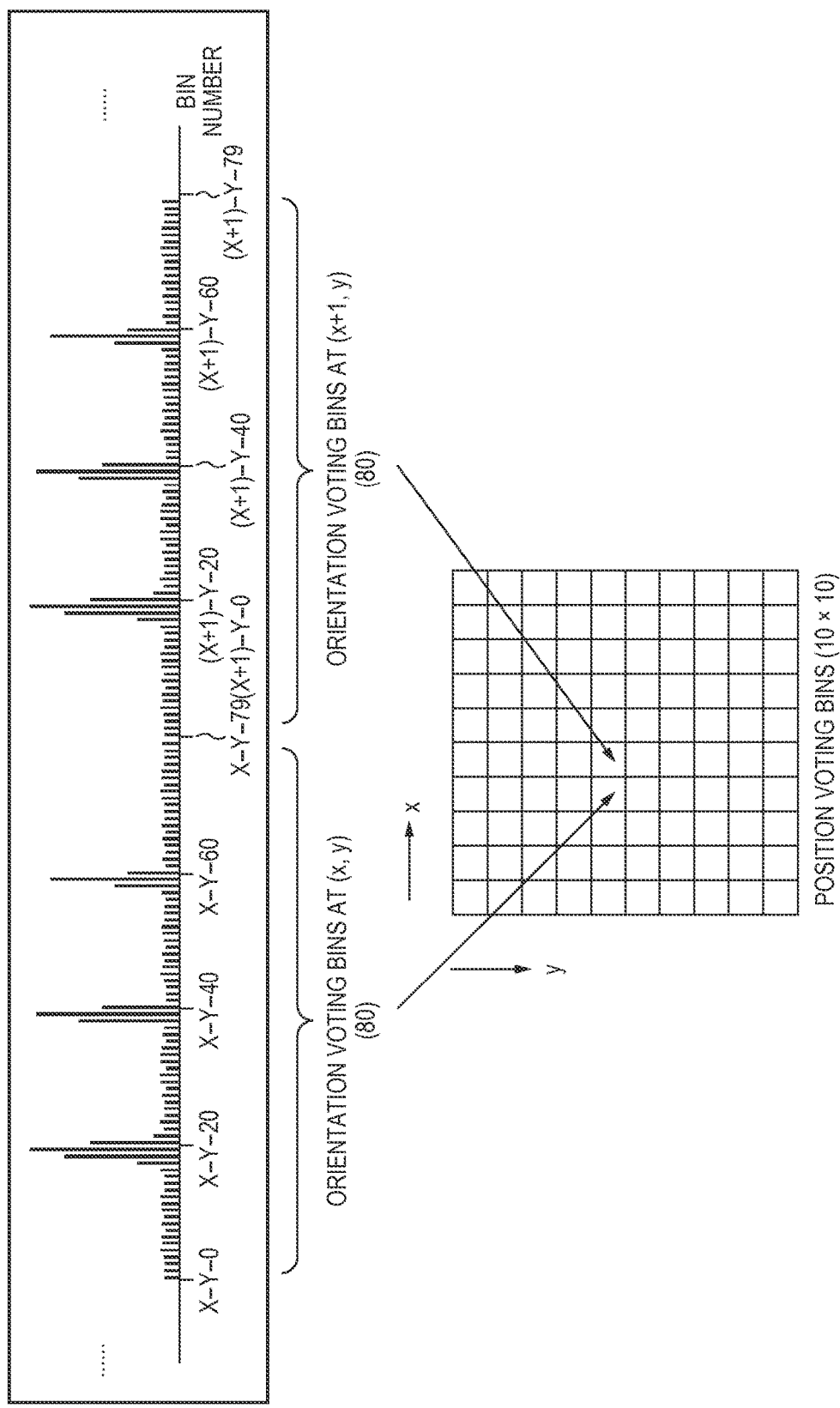
FIG. 3 is a view showing an example of statistical information.

Referring to FIG. 3, bins corresponding to the peaks of the polled vote count indicate bins easy to vote, that is, orientations that readily occur. In FIG. 3, bins easy to vote at coordinates (x, y) are a bin of a bin number X-Y-20 and bins in the vicinity of it. Bins in the vicinity of a bin number X-Y-40 and those in the vicinity of a bin number X-Y-60 follow. Here, all positions are assumed to appear at the same probability, and ease of occurrence of orientations is assumed to be independent of positions. Hence, voting ease for the respective orientation bins is assumed to be equal even at another position such as coordinates (x+1, y).

A shared memory used in this embodiment is assumed to have 4 banks (banks A, B, C, and D). As for default bank allocation to the bins, the banks are cyclically allocated as A, B, C, D, A, . . . in the order of bin numbers.

[Apparatus Arrangement]

Memory access control according to this embodiment will be described below. FIG. 1 is a block diagram showing the arrangement of an information processing apparatus according to this embodiment which can perform a parallel image process.

Referring to FIG. 1, an input/output unit (IO) 11 performs data exchange with the outside by, for example, obtaining image data from the outside or outputting a process result to the outside. A plurality of processor units 12 (PE1, PE2, PE3, . . . ) comprise individual storage units 13 (LM1, LM2, LM3, . . . ), respectively, and perform an image process using partial image data and dictionary data stored in the individual storage units 13.

A global memory (GM) 14 provides areas to store output results from the processor units 12 as a shared memory. A host processor (HP) 15 generally controls the entire apparatus by, for example, allocating a process to each processor unit 12 or instructing data transfer between the input/output unit 11 and the individual storage units 13 or between the global memory 14 and the individual storage units 13. The host processor 15 also allocates banks to be used by the processor units 12 to output results to the global memory 14.

Note that the components for implementing the functions of the embodiment have been defined above, but these definitions do not limit the scope of the present invention. For example, bank allocation is done by the host processor 15 in the above definition. However, a bank allocation unit may exist independently of the host processor 15. The processor units 12 perform an image process using partial image data and dictionary data stored in the individual storage units 13 in the above definition. However, the partial image data and dictionary data may be stored in the global memory 14. That is, the above-described components and definitions serve to explain arrangement examples necessary for implementing memory access control to be described later and any other components or definitions are not excluded.

[Recognition Process for Object Position and Orientation]

Figure 2:
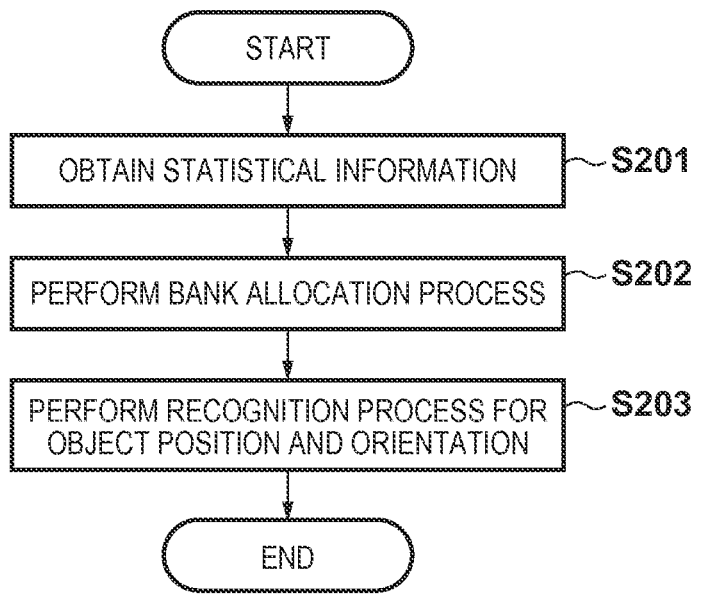
FIG. 2 is a flowchart showing a recognition process for object position and orientation according to the first embodiment.

FIG. 2 is a flowchart showing a recognition process for object position and orientation performed by the information processing apparatus according to this embodiment. First, a statistical information obtaining process is performed (S201). More specifically, the host processor 15 obtains statistical information obtained in advance for a recognition process for object position and orientation (S203) of the subsequent stage. The statistical information corresponds to the information shown in FIG. 3, which is obtained by generating a histogram of the numbers of votes to the respective bins within a predetermined period in advance and represents a memory access frequency distribution in the predetermined period for a memory area corresponding to each bin.

Next, a bank allocation process is performed (S202). The bank allocation process is performed by the host processor 15, and bank allocation of the memory area of the global memory 14 corresponding to each bin is performed based on the statistical information obtained in step S201.

Before the bank allocation process, the banks A, B, C, and D are periodically assigned to memory areas corresponding to the bins, as indicated by a "before bank allocation process" column in FIG. 4. As a result, in the example shown in FIG. 4, the same bank (bank A) is allocated to the memory areas corresponding to the bins of the first, second, and third frequency ranks. In this bank allocation state, bank conflict is expected to increase. To prevent this, a bank allocation process is performed such that banks allocated to memory areas of similar memory access frequencies are distributed.

In the bank allocation process, when the number of banks is N (N is a natural number), a bank of a bank number BN corresponding to a remainder obtained by dividing a frequency rank R (R is a natural number) by the number N of banks is allocated to a memory area of the frequency rank R. That is, BN=(R mod N). Note that bank numbers BN=1, 2, 3, 4 correspond to the banks A, B, C, and D, respectively.

As indicated by an "after bank allocation process" column in FIG. 4, the bank A is allocated to the bin number X-Y-20 of the highest frequency rank (R=1), and the bank B is allocated to the bin number X-Y-40 of the next highest frequency rank (R=2) sequentially by the bank allocation process. If there are a plurality of bins having the same frequency rank R, the banks are allocated in the ascending order of bin numbers. In this way, the banks are allocated to all the 8,000 bins. When the bank allocation process is performed, the banks allocated to memory areas of similar memory access frequencies are distributed.

When the bank allocation process for the memory areas corresponding to all the bins ends in step S202, a recognition process for object position and orientation is executed (S203). In this case, a voting space for position and orientation is allocated to the global memory 14 in accordance with the bank allocation in step S202, and the processor units 12 execute the above-described partial image recognition process using the voting space for position and orientation. Then, the host processor 15 executes a statistical information computing process, thereby obtaining a result of the recognition process for object position and orientation for parts.

As described above, when a bank allocation process based on memory access frequencies is performed, memory accesses are distributed to a plurality of banks, and bank conflict caused by a bank of a high memory access frequency is reduced.

Second Embodiment

The second embodiment of the present invention will be described below. In the second embodiment, a case will be explained in which a process of picking a part is repeated after a recognition process for object position and orientation for parts is performed. Note that only points different from the processes performed by the information processing apparatus according to the first embodiment will be described here, and the rest is the same as in the first embodiment.

[Picking Process]

Figure 5:
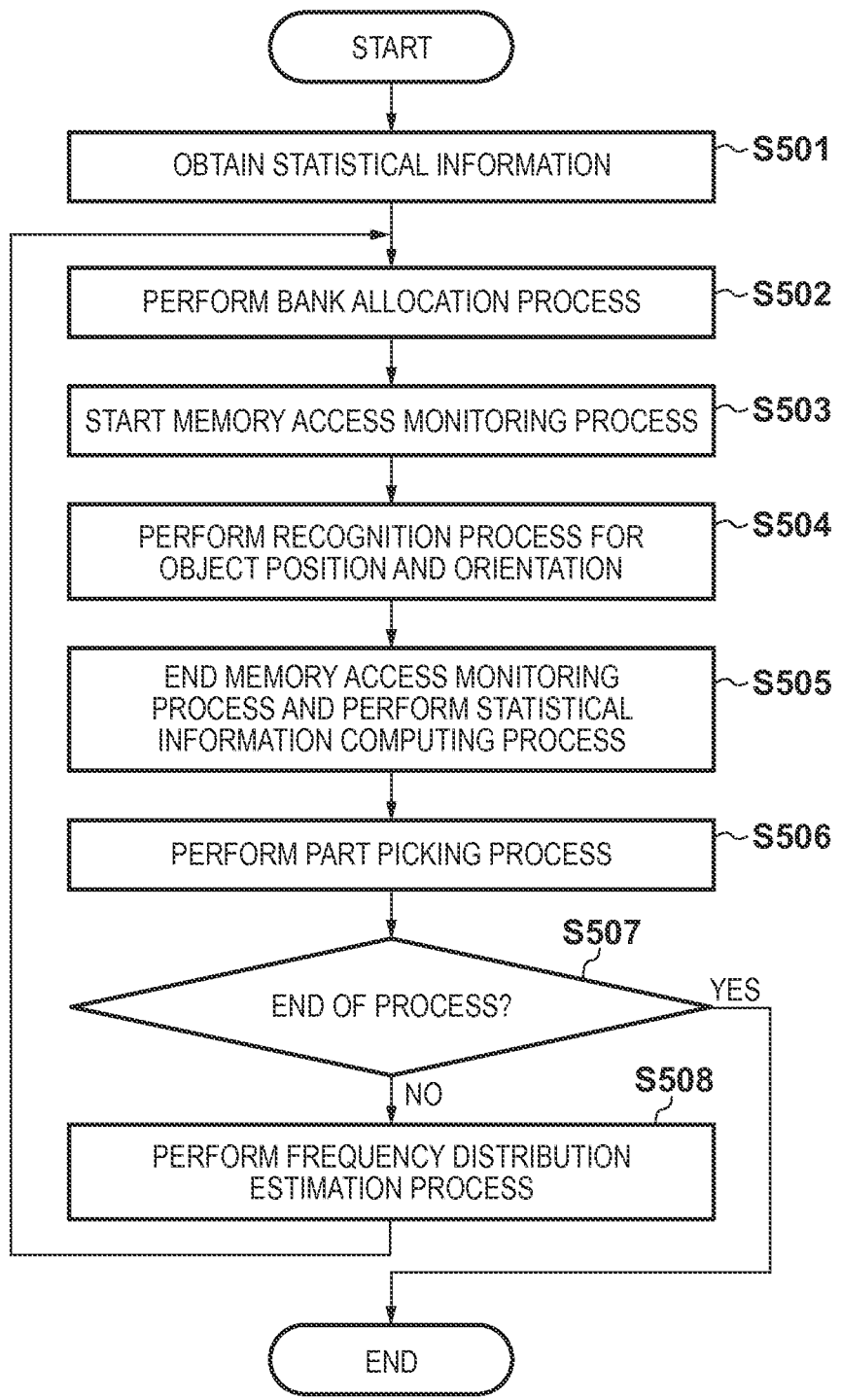
FIG. 5 is a flowchart showing a part picking process according to the second embodiment.

FIG. 5 is a flowchart showing a part picking process performed by an information processing apparatus according to the second embodiment.

First, a statistical information obtaining process is performed as in step S201 of FIG. 2 (S501). More specifically, a host processor 15 obtains statistical information for a recognition process for object position and orientation (S504) of the subsequent stage. The statistical information obtained here represents a memory access frequency distribution within a predetermined period, as in the first embodiment.

Next, the host processor 15 performs a bank allocation process (S502). The bank allocation process is repetitively executed in accordance with determination (S507) to be described later. In the first bank allocation process, banks are allocated to memory areas corresponding to bins using the statistical information obtained in step S501, as in the first embodiment. From the second bank allocation process, bank allocation is done using a memory access frequency distribution estimated by a frequency distribution estimation process (S508) executed by the host processor 15 as statistical information.

Then, the host processor 15 starts a memory access monitoring process (S503). More specifically, a process of monitoring access to a global memory 14 and recording the number of accesses to each memory area corresponding to a bin starts. The next recognition process for object position and orientation (S504) is the same as the process of step S203 of the first embodiment. More specifically, in the recognition process for object position and orientation (S504), a voting space for position and orientation is allocated to the global memory 14 in accordance with the bank allocation process in step S502, the above-described partial image recognition process and statistical information computing process are executed using the voting space for position and orientation, and a result of the recognition process for object position and orientation for parts (recognition result of part positions and orientations) is output.

Next, the host processor 15 ends the memory access monitoring process and performs a statistical information computing process (S505). More specifically, monitoring of memory access to the global memory 14 in the recognition process for object position and orientation of step S504 ends, and a histogram representing the access frequency to each memory area corresponding to a bin (to be referred to as an "access frequency histogram" hereinafter) is created.

Then, the host processor 15 performs picking of a target part based on the recognition result of part positions and orientations obtained in step S504 (S506). The host processor 15 then determines whether to end the process or perform next picking (continue the process) (S507). To continue the process, the process advances to a frequency distribution estimation process (S508).

When continuing the process, the host processor 15 estimates the memory access frequency distribution of next time using the recognition result of part positions and orientations obtained in step S504 and the access frequency histogram created in step S505 (S508). Then, the process returns to step S502 to repeat the process from the bank allocation process.

As described above, in the second embodiment, statistical information (memory access frequency distribution) is dynamically computed, thereby dynamically performing the bank allocation process.

[Frequency Distribution Estimation Process]

The frequency distribution estimation process (S508) of estimating the memory access frequency distribution of next time will be described below.

FIG. 6A shows the recognition result of part positions and orientations obtained by the recognition process for object position and orientation (S504). FIG. 6A shows an example in which the positions of three parts are recognized, including the first to third candidates. Note that all bins (both the position and orientation) at positions other than the recognized positions are assumed to have the lowest frequency rank.

After the part located at the coordinate position (x0, y0) of a bin a having the maximum polled vote count, that is, the first candidate part, is picked in the immediately preceding part picking process (S506), no recognized part exists at the picking position. That is, the possibility that voting to the bin of the position of the picked part is done statistically lowers. Hence, the vote count of next time to the part position of the picking target and positions in the vicinity of it is regarded as 0. "Vicinity" indicates a rectangular region of 3×3 bins with respect to the bin at the coordinates (x0, y0) as the center. In other words, all frequency values of the histogram included in the rectangular region are set to 0. This is equivalent to applying a mask process for the histogram.

In the frequency distribution estimation process, a thus obtained histogram is output as an estimated memory access frequency distribution. FIG. 6B shows a result of the frequency distribution estimation process when the recognition result shown in FIG. 6A is obtained by the recognition process for object position and orientation. Referring to FIG. 6B, the frequency values in the rectangular region of 3×3 bins with respect to the bin a at the coordinates (x0, y0) as the center are 0.

In the bank allocation process, banks are allocated to memory areas corresponding to the bins using the memory access frequency distribution estimated by the frequency distribution estimation process as statistical information except for the time of first execution.

[Bank Allocation Process]

The bank allocation process according to the second embodiment will be explained here.

In the first embodiment, the bank allocation process is performed such that banks allocated to memory areas of similar memory access frequencies are distributed. In the second embodiment, however, the bank allocation process is performed such that the access frequencies to the banks are leveled.

FIG. 7 shows an example of bank allocation in which after picking is performed in step S506 in accordance with the bank allocation process of step S502, the frequency distribution estimation process is performed in step S508, and the bank allocation process is performed again in step S502 based on the estimation result. For example, a "before bank allocation process" column in FIG. 7 indicates the result of the first bank allocation process, and an "after bank allocation process" column indicates the result of the second bank allocation process.

Referring to FIG. 7, out of the "frequency ranks" obtained by the first bank allocation process, bins in the vicinity of a bin number X0-Y0-20 having the highest frequency rank by picking are masked to have a frequency value 0. Hence, in the example shown in FIG. 7, a bin number X1-Y1-47 has the highest frequency rank after mask application in the frequency distribution estimation process, and a bank A is allocated to a memory area corresponding to the bin. Similarly, banks B, C, and D are sequentially allocated to memory areas corresponding to the bins of the second to fourth frequency ranks after mask application.

Place focus on the frequency values added to the bin numbers corresponding to the banks. According to the example shown in FIG. 7, the frequency values for the banks allocated to the memory areas corresponding to the bins up to the fourth frequency rank after the bank allocation process are 6 for the bank A, 5 for the bank B, 4 for the bank C, and 3 for the bank D. The frequency values for the banks correspond to the access frequencies for the banks.

When bank allocation to the memory areas corresponding to the bin numbers up to the fourth frequency rank after the bank allocation process is performed, a bank having the minimum frequency value (in this case, bank D) is allocated next to a memory area corresponding to a bin number X1-Y1-48 (frequency value: 2) of the fifth frequency rank after the bank allocation process.

The frequency values for the banks A, B, C, and D at this point of time are 6, 5, 4, and 3+2=5, respectively. Next, the bank C having the minimum frequency value is allocated next to a memory area corresponding to a bin number X2-Y2-36 of the sixth frequency rank after the bank allocation process. The frequency values for the banks A, B, C, and D at this point of time are 6, 5, 4+1=5, and 3+2=5, respectively.

The bank allocation process is repeated in the same way as described above. When the bank allocation process is thus performed based on the sum of frequency ranks corresponding to the banks, the access frequencies for the banks are leveled.

In addition, when the bank allocation process is performed after unnecessary statistical information is removed by the mask process after picking, memory access of next time can efficiently be performed. If the bank allocation process based on the sum of frequency ranks is executed without applying a mask, bank conflict is expected to readily occur. This is because the banks are preferentially allocated to the bin a at the coordinates (x0, y0) whose use frequency will be lower from the next time while the banks are repetitively allocated to the bins (X1-Y1-47 and X2-Y2-35) of the fourth and fifth frequency ranks whose use frequency will rise. When the frequency distribution estimation process (S508) of computing latest statistical information is provided, it is possible to dynamically cope with situations in which the memory access frequency changes every moment.

Third Embodiment

The third embodiment of the present invention will be described below. In the third embodiment, an example will be explained in which a specific target object moving on an image is recognized and tracked in a moving image data process or the like. Note that only points different from the processes performed by the information processing apparatuses according to the first and second embodiments will be described here, and the rest is the same as in the first and second embodiments. Note that the target object to be tracked is assumed to only translate on a screen for a descriptive convenience. In addition, the number of target objects is limited to one.

[Tracking Process]

Figure 8:
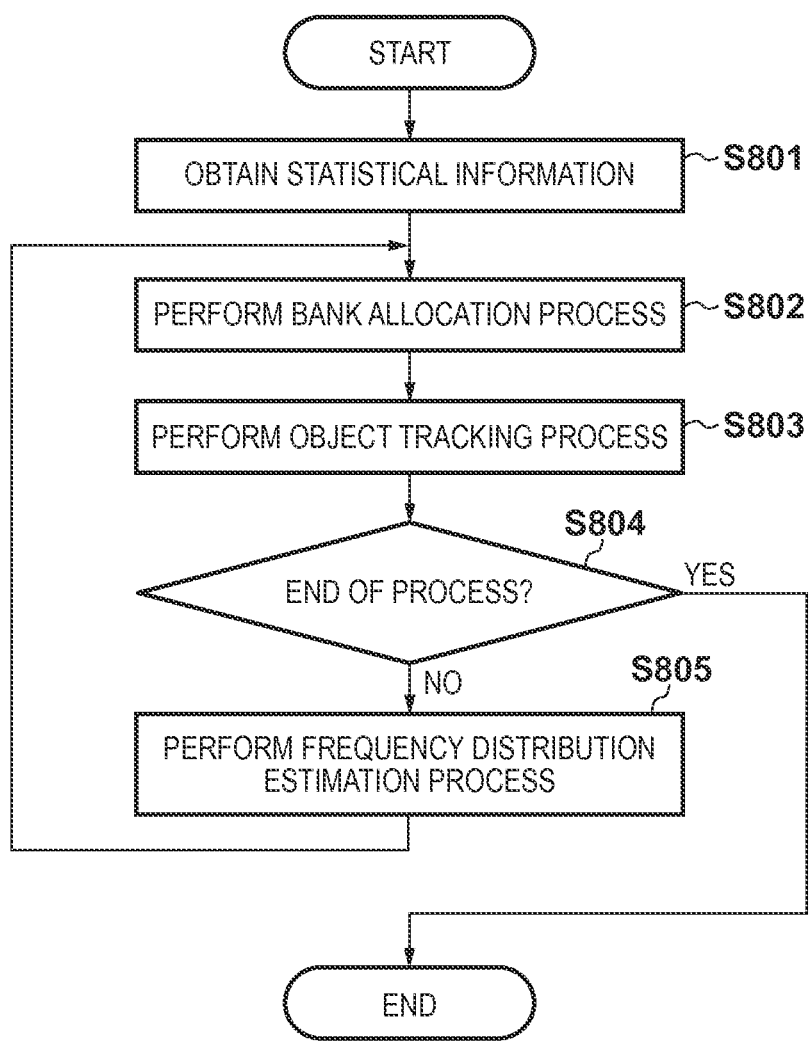
FIG. 8 is a flowchart showing a tracking process according to the third embodiment.

FIG. 8 is a flowchart showing a tracking process performed by an information processing apparatus according to the third embodiment.

First, statistical information (memory access frequency distribution) is obtained as in step S201 of FIG. 2 (S801).

Next, a host processor 15 performs a bank allocation process (S802). The bank allocation process is repetitively executed in accordance with determination (S804) to be described later. In the first bank allocation process, banks are allocated to memory areas corresponding to bins using the statistical information obtained in step S801, as in the first embodiment. From the second bank allocation process, bank allocation is done using a memory access frequency distribution estimated by a frequency distribution estimation process (S805) executed by the host processor 15 as statistical information.

Then, an object tracking process is performed (S803). More specifically, the position and orientation of a target object are recognized by a recognition process for object position and orientation (S203) described in the first embodiment, and a histogram of object position and orientation generated at that time and a recognition result of object position and orientation are obtained. The host processor 15 generates, for the same target object, a motion vector representing the moving amount and moving direction of the target object on the screen from the difference with respect to the previous recognition result of object position and orientation as moving information of the target object.

The host processor 15 then determines whether to end the process or continue the process (S804). To continue the process, the process advances to a frequency distribution estimation process (S805). Note that the tracking process ends based on, for example, an end instruction by the user or occurrence of an untrackable state such as frame out of the target object.

When continuing the process, the host processor 15 estimates the memory access frequency distribution of next time using the recognition result of object position and orientation obtained in step S803 and the moving information (S805). Then, the process returns to step S802 to repeat the process from the bank allocation process.

[Object Tracking Process]

The object tracking process (S803) will be described below.

Figure 9:
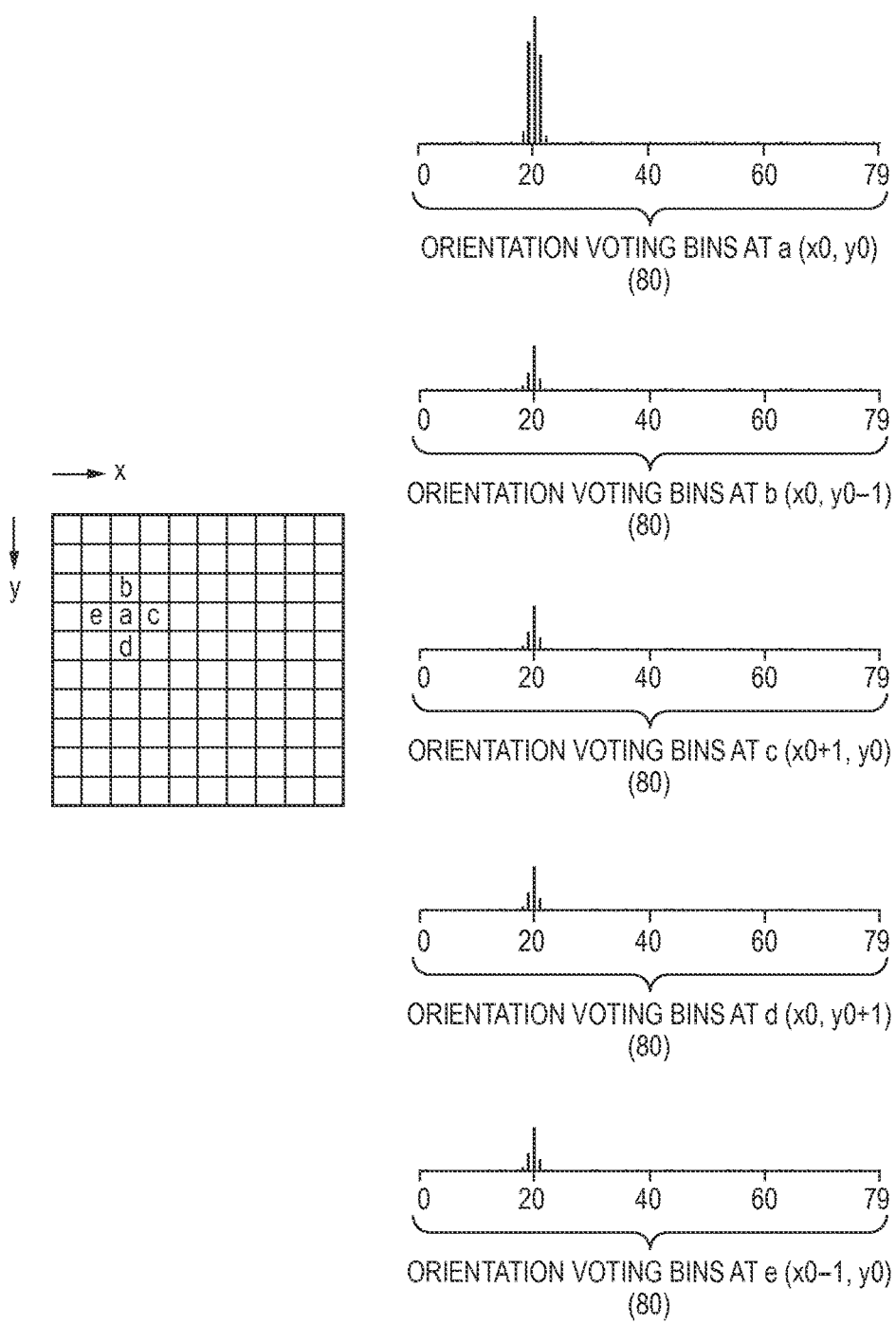
FIGS. 9 and 10 are views showing examples of histograms of object position and orientation.
Figure 10:
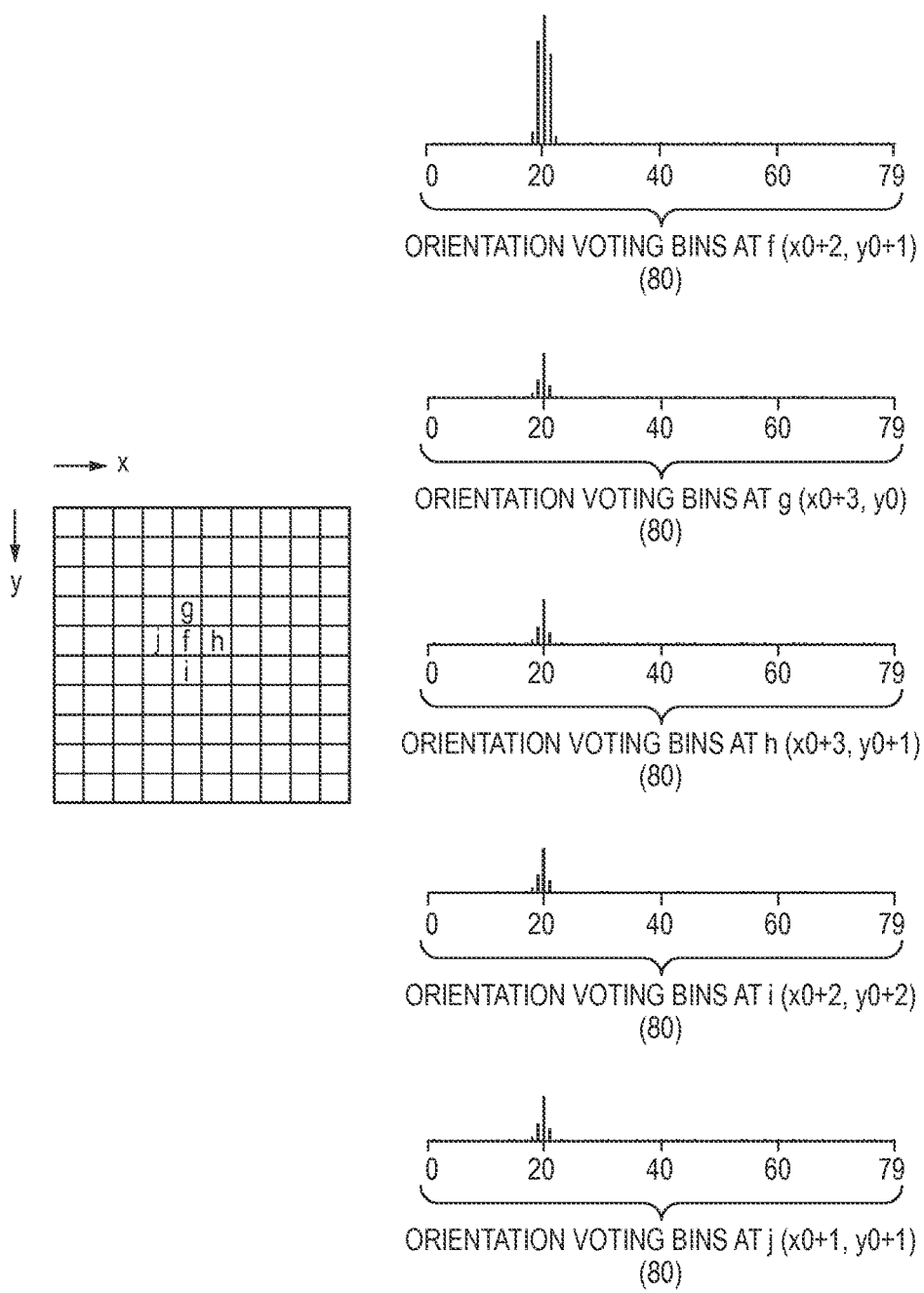

FIG. 9 shows an example of a histogram of object position and orientation generated previously, and FIG. 10 shows an example of a histogram of object position and orientation generated this time. According to the computing method of a recognition result of object position and orientation described in the first embodiment, a position and orientation corresponding to a bin having the maximum vote count are the position and orientation of the target object. For this reason, the examples of FIGS. 9 and 10 indicate that the target object moves from coordinates a (x0, y0) to f (x0+2, y0+1), and a motion vector v (2, 1) is obtained.

[Frequency Distribution Estimation Process]

The frequency distribution estimation process (S805) will be described below. Note that in step S805, the memory access frequency distribution of next time is estimated as in the process of step S508 of the second embodiment.

In the object tracking process, when performing the next recognition process for the target object, the target object is moving at a high possibility. Hence, the memory access frequency distribution is also expected to change in accordance with the movement of the target object.

In the frequency distribution estimation process, the histogram of object position and orientation obtained by the object tracking process is translated in accordance with the motion vector computed in the object tracking process, and the histogram of object position and orientation after the translation is output as a result of the frequency distribution estimation process. That is, the target object is assumed to make a linear uniform motion in accordance with the motion vector during the time elapsed from the previous process. Note that the histogram of object position and orientation is assumed to be output at an almost predetermined rate.

Figure 11:
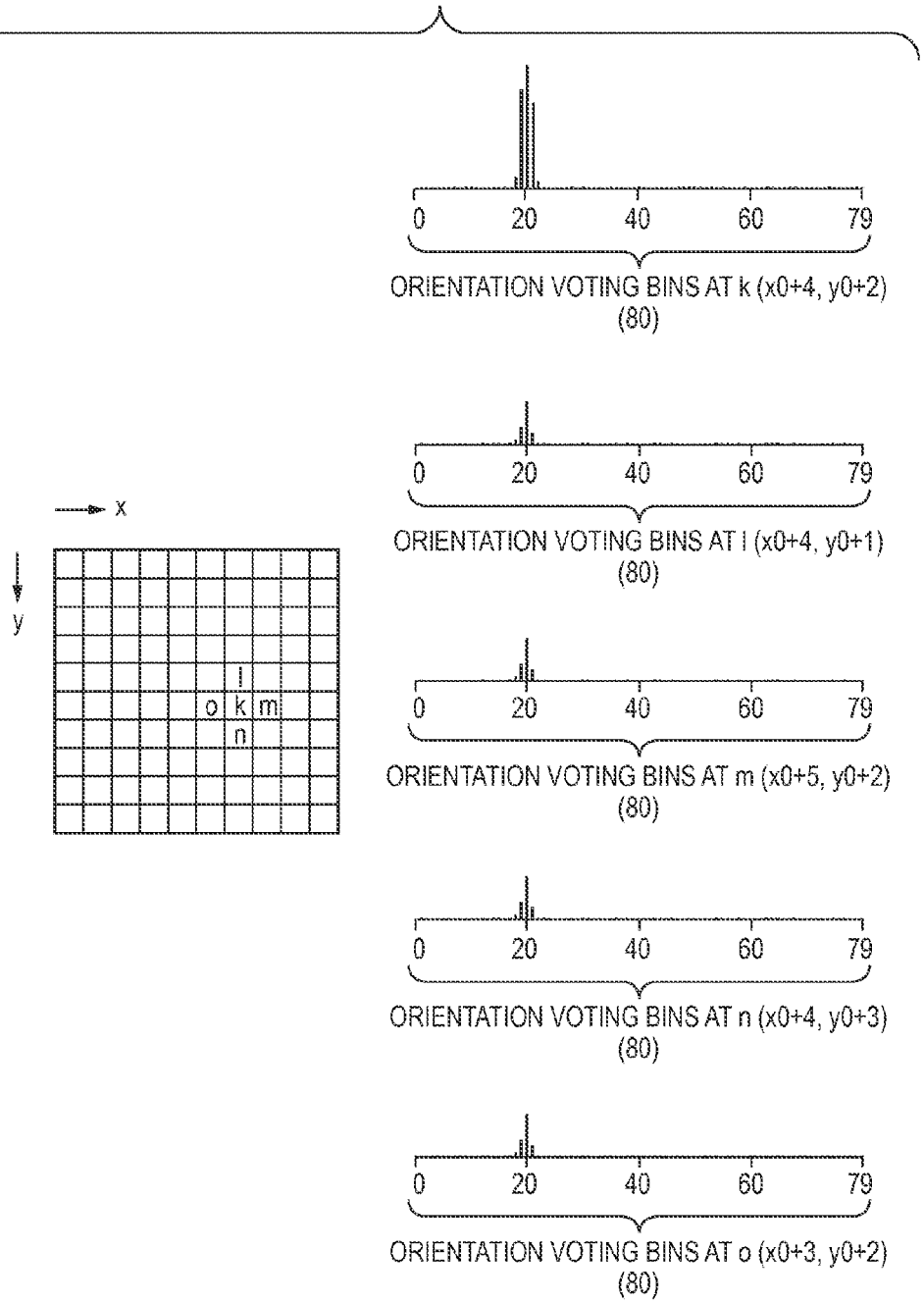
FIG. 11 is a view showing an estimation example of a frequency distribution estimation process.

FIG. 11 shows an estimation example of the frequency distribution estimation process in step S805, that is, an example of a histogram of object position and orientation obtained by performing the translation based on the histograms of object position and orientation in FIGS. 9 and 10. Note that to consider a slight shift of movement, a Gaussian filter may be applied to the histogram of object position and orientation after the translation. The frequency distribution estimation process outputs the thus obtained histogram of object position and orientation as a memory access frequency distribution. Note that all bins (both the position and orientation) at positions other than positions k, l, m, n, and o in FIG. 11 are assumed to have the lowest frequency rank.

[Bank Allocation Process]

In the bank allocation process (S802), banks are allocated to memory areas corresponding to bins using the memory access frequency distribution estimated by the frequency distribution estimation process (S805) as new statistical information. FIG. 12 shows the state of allocation. FIG. 12 illustrates an example in which banks allocated to memory areas of similar memory access frequencies are distributed, as in the first embodiment. At this time, the banks are reallocated not to memory areas corresponding to the bins of the lowest frequency rank but to memory areas corresponding to bins for which access occurs at a high possibility.

In this way, when a memory access frequency distribution of next time is estimated based on memory access frequency distributions obtained by two past frequency distribution estimation processes, and the bank allocation process is then performed, memory access of next time can be performed more efficiently. In addition, since memory areas to which banks are allocated are limited based on the memory access frequency, a process load associated with a bank reallocation process can be reduced.

Fourth Embodiment

The fourth embodiment of the present invention will be described below. In the fourth embodiment as well, an example will be explained in which a specific target object moving on an image is recognized and tracked, as in the third embodiment. In this example, however, the number of memory areas to be used is smaller than the number of banks. Note that only points different from the processes performed by the information processing apparatuses according to the first to third embodiments will be described here, and the rest is the same as in the first to third embodiments.

[Tracking Process]

Figure 13:
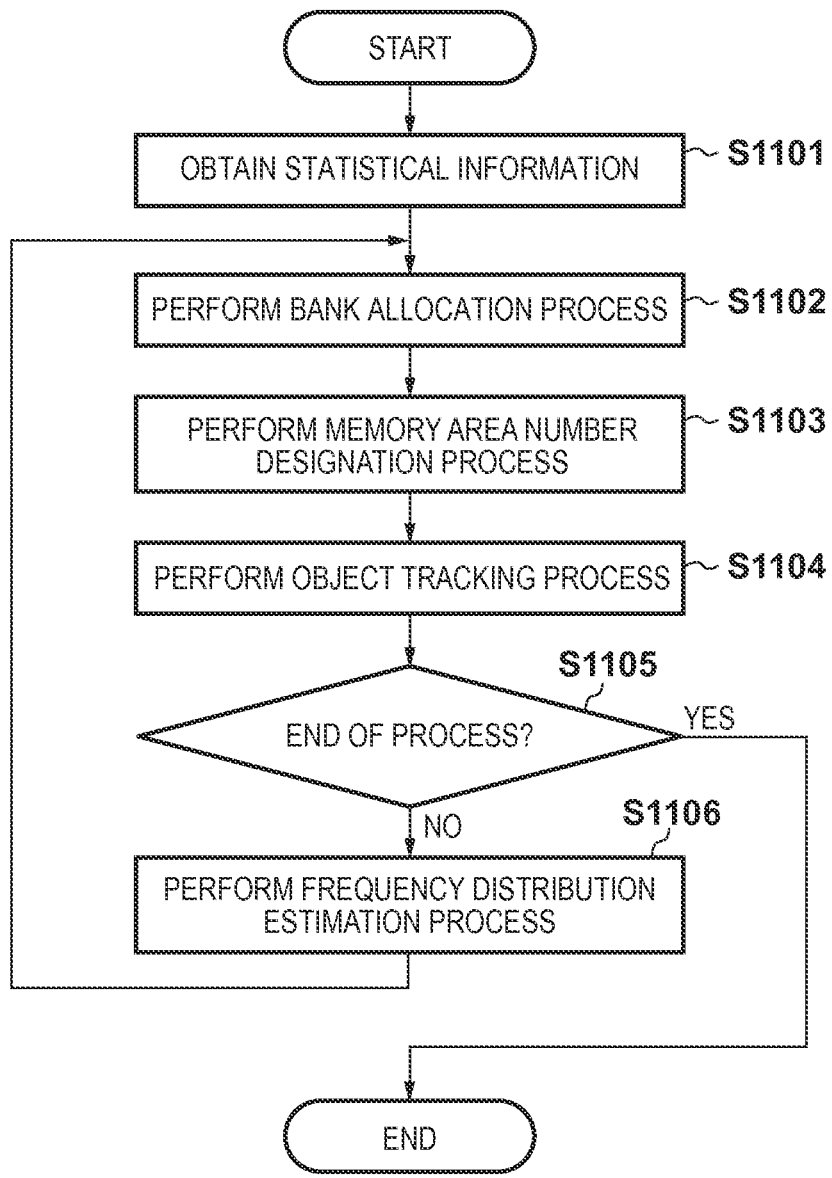
FIG. 13 is a flowchart showing a tracking process according to the fourth embodiment.

FIG. 13 is a flowchart showing a tracking process performed by an information processing apparatus according to the fourth embodiment.

First, statistical information (memory access frequency distribution) is obtained as in step S201 of FIG. 2 (S1101).

Next, a host processor 15 performs a bank allocation process (S1102). The bank allocation process is repetitively executed in accordance with determination (S1105) to be described later. In the first bank allocation process, banks are allocated to memory areas corresponding to bins using the statistical information obtained in step S1101, as in the first embodiment. From the second bank allocation process, bank allocation is done using a memory access frequency distribution estimated by a frequency distribution estimation process (S1106) executed by the host processor 15 as statistical information.

In step S1102, a bank allocation process in a case in which the number of voted bins is smaller than the number of banks (in this case, four, A to D banks) in statistical information is performed. In the third embodiment, banks allocated to memory areas of similar memory access frequencies are distributed, as in the first embodiment. In the fourth embodiment, however, a plurality of banks are allocated to a memory area to which memory accesses concentrate. In other words, a plurality of banks are allocated to a memory area to which memory accesses concentrate, thereby distributing accesses to the memory area to the plurality of banks.

Figure 14:
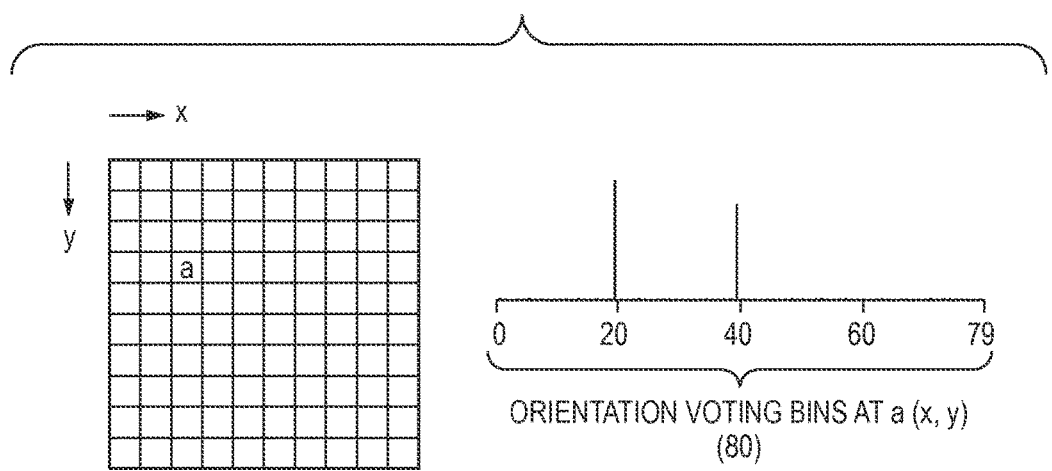
FIG. 14 is a view showing an example of statistical information.

FIG. 14 is a view for explaining the bank allocation process according to the fourth embodiment. As shown in FIG. 14, memory accesses occur only in two specific memory areas whose bin numbers are assumed to be X-Y-20 and X-Y-40.

In the fourth embodiment, accesses to memory areas are performed by making full use of the four banks. First, two memory areas are newly allocated to the bin number X-Y-20 (memory area numbers 1 and 2). In addition, two memory areas are newly allocated to the bin number X-Y-40 (memory area numbers 3 and 4). Then, different banks are allocated to the four memory areas, respectively. More specifically, the banks A to D are allocated to the memory area numbers 1 to 4, respectively.

Next, the host processor 15 designates, for each processor unit 12, memory area numbers M used to access the memory areas corresponding to the bin numbers X-Y-20 and X-Y-40. Let N (natural number) be a number added to each processor unit 12. A memory area number $M_{N20}$ designated for each processor unit 12 when accessing the bin number X-Y-20 is expressed as $M_{N20}=(N \bmod 2)$. Similarly, a memory area number $M_{N40}$ when accessing the bin number X-Y-40 is expressed as $M_{N40}=(2+(N \bmod 2))$. When the memory area numbers M are thus designated, accesses to memory areas corresponding to one bin number can be distributed to two banks.

Next, an object tracking process is performed (S1104), as in step S803 of the third embodiment. In the object tracking process according to the fourth embodiment, the polled vote counts of bins distributed to the plurality of memory areas in the bank allocation process of step S1102 are integrated. More specifically, the sum of the voting results of the two memory areas allocated to the bin number X-Y-20 is computed, and the sum is defined as the polled vote count of the bin number X-Y-20. This also applies to the bin number X-Y-40. Statistical information computing is executed using the integrated polled vote counts, and the position and orientation of the target object are recognized.

From then on, the process from the bank allocation process of step S1102 is repeated in accordance with a memory access frequency distribution estimated in step S1106 until it is determined to end the process in step S1105, as in the third embodiment.

As described above, accesses to memory areas to which memory accesses concentrate are distributed to a plurality of banks, thereby reducing bank conflict.

Modification of Embodiments

In the above embodiments, an example in which the bank conflict reduction effect is enhanced by allocating banks based on statistical information of memory accesses has been described. The statistical information at that time is not limited to the histogram shown in FIG. 3, and any information that can be associated with the memory access frequency is usable. For example, information output from a device that directly measures the memory access frequency or information generated in the course of a main process may be used.

For example, in the second embodiment, an example has been described in which statistical information based on a memory access frequency distribution obtained at the time of a memory access monitoring process and a recognition result of part positions and orientations obtained from a recognition process for object position and orientation is used. Instead, statistical information based on a histogram of object position and orientation generated in a recognition process for object position and orientation and a recognition result of part positions and orientations obtained from a recognition process for object position and orientation may be used.

In the second embodiment, an example has been described in which a preset rectangular region is applied to create a histogram except a picking target part position and its peripheral region. However, a region having an arbitrary shape is applicable in accordance with a part shape.

In the third embodiment, an example has been described in which a histogram of object position and orientation obtained by translating, based on moving information of a target object, a histogram of object position and orientation obtained by an object tracking process is used as statistical information. Instead, a histogram of object position and orientation translated based on a sum of a motion vector and an orientation vector obtained from the orientation information of the target object may be used as statistical information. The target object has been assumed to only translate on a screen for a descriptive convenience. However, it is also possible to cope with rotation, enlargement/reduction, movement in a three-dimensional space, and the like. For example, when rotation occurs, a rotation axis, rotation direction, and rotation amount are obtained by an object tracking process. A histogram of object position and orientation rotated and moved using these pieces of information can be used as statistical information.

The bank allocation process can be done by any method as long as it is based on statistical information. For example, in the first embodiment, a method of allocating banks in the order of a frequency distribution of statistical information has been described. Instead, a threshold may be provided for the frequency values, and banks may sequentially be allocated to memory areas corresponding to bins having frequency values equal to or larger than the threshold. In this case, to memory areas corresponding to bins having frequency values smaller than the threshold, banks are allocated based on a predetermined pattern, or a predetermined general-purpose bank is allocated. Alternatively, memory areas corresponding to bins having frequency values smaller than the threshold may be excluded from the allocation targets.

In the first embodiment, an example in which banks allocated to memory areas of similar memory access frequencies are distributed has been described. In the second embodiment, an example in which access frequencies to banks are leveled has been described. However, bank allocation may be done complying with another rule. For example, if the frequency distribution is broad, the bank allocation process may be performed so as to prevent same banks from being allocated to banks around a peak of the frequency distribution as much as possible. For bins having frequency values equal to or larger than a predetermined threshold with respect to a peak position as the center, different banks are allocated to memory areas corresponding to adjacent bins. Note that the threshold in that case can be set either manually or automatically using, for example, statistical information such as an average or variance of a memory access frequency distribution.

In the fourth embodiment, an example in which accesses concentrate to two memory areas has been described. The bank allocation process according to the fourth embodiment is applicable when the number of memory areas to which accesses concentrate is smaller than the number of banks. Note that in the fourth embodiment, an example in which accesses of the memory areas are uniformly distributed to the banks has been described. However, for example, accesses to memory areas with high access frequencies may be distributed to more banks. Alternatively, a threshold may be provided for memory access frequencies, and the bank allocation process according to the fourth embodiment may be applied to bins having frequency values equal to or larger than the threshold.

In the above embodiments, an example in which bank allocation control is done in a recognition process for object position and orientation has been described. However, any process of performing memory access is usable as a process (main process) to which bank allocation control is applied. For example, bank allocation control is applicable to an arbitrary memory access process such as a dictionary consultation process of causing a plurality of processor elements to read out data from a single memory.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-067126 filed Mar. 27, 2013 which is hereby incorporated by reference herein in its entirety.

What is claimed is:

1. An information processing apparatus comprising:
a memory having a plurality of banks;
a plurality of processor elements configured to track an object in a moving image by sequentially performing a recognition of a position and orientation of the object with accessing memory areas corresponding to candidates of the position and orientation in the memory;
an obtaining unit configured to obtain a current recognition result of the position and orientation of the object, and obtain, as a current access frequency distribution, an access frequency distribution to a plurality of memory areas of the memory in a current recognition by the plurality of processor elements;
a detection unit configured to detect a moving amount and moving direction of the object based on the current recognition result and a preceding recognition result of the position and orientation of the object;
an estimation unit configured to estimate a succeeding access frequency distribution by modifying the current access frequency distribution based on the detected moving amount and moving direction of the object; and
an allocation unit configured to allocate the plurality of banks to the plurality of memory areas based on the estimated succeeding access frequency distribution.

2. The apparatus according to claim 1, wherein the estimation unit translates the current access frequency distribution based on a vector representing the detected moving amount and moving direction of the object so as to obtain a translated access frequency distribution as the succeeding access frequency distribution.

3. The apparatus according to claim 1, wherein the allocation unit allocates the plurality of banks to the plurality of memory areas such that access to the plurality of memory areas is distributed to the plurality of banks.

4. The apparatus according to claim 1, wherein the allocation unit allocates the plurality of banks to the plurality of memory areas such that access frequencies of the plurality of banks are leveled.

5. The apparatus according to claim 1, wherein the allocation unit allocates one of the plurality of banks to the memory area for which an access frequency represented by the succeeding access frequency distribution is not less than a predetermined threshold, and allocates a predetermined bank to the memory area for which the access frequency is less than the predetermined threshold.

6. The apparatus according to claim 1, wherein the allocation unit allocates one of the plurality of banks to the memory area for which an access frequency represented by the succeeding access frequency distribution is not less than a predetermined threshold, and allocates no bank to the memory area for which the access frequency is less than the predetermined threshold.

7. A memory control method of an information processing apparatus which has a plurality of processor elements configured to perform information processing and a memory having a plurality of banks, the method comprising:
using a processor to perform:
tracking an object in a moving image by sequentially performing a recognition of a position and orientation of the object with accessing memory areas corresponding to candidates of the position and orientation in the memory;
obtaining a current recognition result of the position and orientation of the object;
obtaining, as a current access frequency distribution, an access frequency distribution to a plurality of memory areas of the memory in a current recognition by the plurality of processor elements;
detecting a moving amount and moving direction of the object based on the current recognition result and a preceding recognition result of the position and orientation of the object;
estimating a succeeding access frequency distribution by modifying the current access frequency distribution based on the detected moving amount and moving direction of the object; and allocating the plurality of banks to the plurality of memory areas based on the estimated succeeding access frequency distribution.

8. A non-transitory computer readable medium storing a computer-executable program for causing a computer which has a plurality of processor elements configured to perform information processing and a memory having a plurality of banks to perform:

tracking an object in a moving image by sequentially performing a recognition of a position and orientation of the object with accessing memory areas corresponding to candidates of the position and orientation in the memory;

obtaining a current recognition result of the position and orientation of the object;

obtaining, as a current access frequency distribution, an access frequency distribution to a plurality of memory areas of the memory in a current recognition by the plurality of processor elements;

estimating a succeeding access frequency distribution by modifying the current access frequency distribution based on the detected moving amount and moving direction of the object; and allocating the plurality of banks to the plurality of memory areas based on the estimated succeeding access frequency distribution.

\* \* \* \* \*